United States Patent Office 3,329,546
Patented July 4, 1967

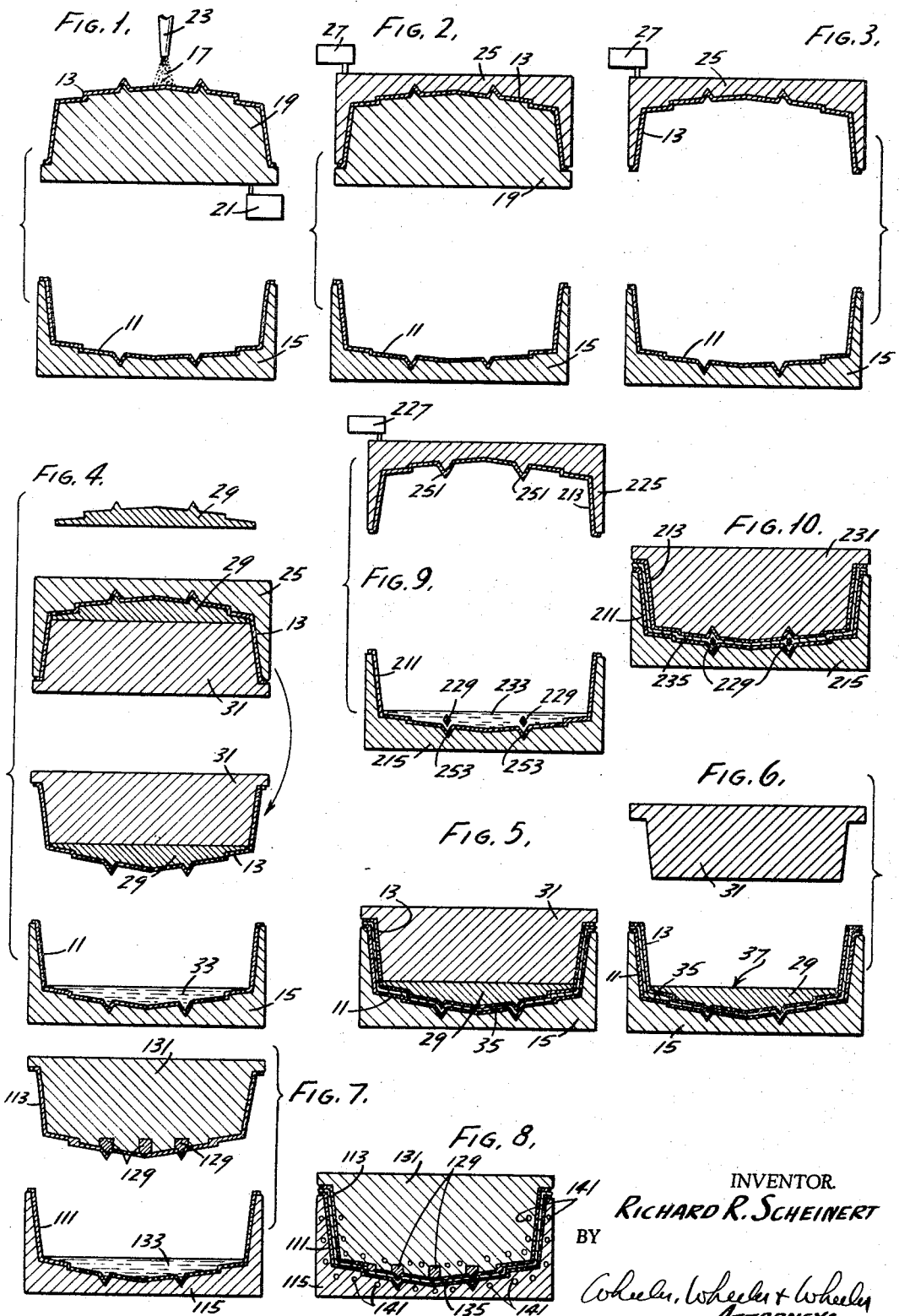

3,329,546
MOLDING METHOD
Richard R. Scheinert, Waukegan, Ill., assignor to Outboard Marine Corporation, Waukegan, Ill., a corporation of Delaware
Filed Dec. 6, 1962, Ser. No. 242,689
4 Claims. (Cl. 156—228)

The invention relates generally to molding methods. More particularly, the invention relates to plastic molding methods.

The invention provides a method for fabricating and bonding two or more laminates together in such manner as to substantially exclude air from the finished product, thereby assuring uniformity of the bond between the laminates, and to provide for fabrication of one of the laminates with a finished exterior surface, thereby substantially eliminating any need for finishing the exterior surface of the molded product, as by painting or otherwise.

In previous match-metal molding processes, the male and female die were telescopically engaged about the periphery of the resulting molded article so that a substantially air tight seal was established at a point before full insertion of the male die within the female die, thereby entrapping air in the space between the dies and preventing escape of such air as movement of the male die into the female die was continued.

In the disclosed process, air is excluded from between bonded male and female laminates by reason of upward flow of a self-curing polyester resin from a pool in the female laminate at the low point of the interface between the laminates, which flow occurs incident to insertion of the male laminate into the female laminate. The quantity of resin introduced into the male laminate is controlled so that resin flow to the periphery of the finished product is obtained. The use of self-curing resin substantially eliminates the need for the application of heat to effect curing of the resin, thereby simplifying the construction of the dies or molds and avoiding any problem with respect to damaging the pre-cured laminates by reason of the application of heat.

A finished outer surface on the resulting laminated product is provided in accordance with the invention by fabrication in a female mold or die of a female laminate of polyester resin, thereby providing the female laminate with a relatively hard, lustrous, smoothly finished outer surface conforming to the female mold, which surface ultimately becomes the outer surface of the finished product. As already indicated, the other face or surface of the female laminate provides a well or sump into which the laminate-bonding, self-curing resin is introduced, immediately prior to insertion of the male laminate.

The invention also provides a method of building up a fibrous laminate including the steps of moving or passing a device for spraying a mixture of fibrous material and a binder relative to a mold or preform which, at least temporarily, is fixed and which is subject to a vacuum created through the wall of the mold in order to cause adherence of the fibers to the shape of the mold during curing of the binder. Other objects and advantages of the invention will become known by reference to the following description and the accompanying drawings, in which:

FIGURE 1 is a diagrammatic view of one stage in the disclosed molding method which is shown in connection with the molding of a boat hull;

FIGURE 2 is a diagrammatic view similar to FIGURE 1 showing another stage in the disclosed molding method;

FIGURE 3 is also a diagrammatic view showing a further stage in the disclosed molding method;

FIGURE 4 is a further diagrammatic view of a further stage in the disclosed molding method;

FIGURE 5 is still another diagrammatic view of a still further stage in the disclosed molding method;

FIGURE 6 is a diagrammatic view of still another stage in the disclosed molding method;

FIGURE 7 is a view similar to a portion of FIGURE 4 showing the molding of a modified boat hull;

FIGURE 8 is a view similar to FIGURE 5 showing a further stage in the molding of the boat hull modification initially shown in FIGURE 7;

FIGURE 9 is a diagrammatic view, similar in part to FIGURE 3, showing one stage in the molding of another modified boat hull; and FIGURE 10 is a view similar to FIGURE 5 showing a further stage in the molding of the boat hull modification shown in FIGURE 9.

Although the methods disclosed herein are shown in association with the molding of a boat hull, the invention is not limited to the molding of boat hulls, but is applicable to any article which is recessed or dished, and which, preferably, has a periphery which lies substantially in a single plane.

The disclosed method involves the step of producing two laminates, the first or female laminate 11 being regarded as the outer or exterior laminate and being fabricated of polyester resin with a finished outer exterior surface, and the second or male laminate 13 being regarded as an inner laminate and being built up of fibrous material.

Specifically, the female or outer laminate 11 can be conventionally formed by spraying or otherwise depositing, in a relatively cold female mold or die 15, a thin layer of polyester resin, such as "Gel-Kote," a trademark designating a product of the Glidden Company, which resin can be colored as desired, and, when cured, provides a hard and smooth, lustrous surface which is ultimately the outer surface of the boat hull. Use of a relatively cold die aids in the attainment of a finished surface of superior quality.

The male or second laminate 13, which may also be considered an outer laminate in that it provides the inner surface of the completed boat hull, is obtained by spraying or otherwise directing a flow of short lengths of fiber 17, such as fiberglass, toward a male preform or mold 19. The male preform 19 is perforated and, on the side opposite from the side of application of the fibers, is connected to a vacuum source 21, whereby the fibers 17 are drawn against the preform 19 and are retained in place during the setting of a resinous polyester binder which is simultaneously applied with the fibers. The resulting laminate 13 is principally hetrogeneously laid fiber and is of relatively light density, having considerable air space between the fibers which are united at their intersections by the binder.

The male preform 19 can be perforated in any desired manner to provide a surface against which the fibers 17 are adhered by vacuum, which surface conforms generally to the inner shape of the first or female laminate 11. The preform can be perforated to any extent consistent with retention of the fibers on the preform while permitting passage of air through the preform. Any suitable means for establishing a vacuum can be connected in any suitable manner to the male preform.

In one method of building up the male or second laminate 13, the male preform 19 is supported in fixed position in communication with the vacuum source 21, while a moving spray means 23, directing a stream of fibers 17 and binder, is moved relative to the male preform 19 to effect application of the fibers and binder over the entire area of the preform. The use of a moving spray means 23 as compared to a moving preform is preferred, as this type of arrangement is considerably simplified as compared to an installation including a fixed spray means and moving preform.

When formation of the male or second laminate 13 on the preform 19 is completed, a perforated female die or preform 25 is moved into position on the exposed side of the second laminate 13. The vacuum applied to the male preform 19 is then disconnected and a separate vacuum is applied by suitable vacuum means 27 through the female preform 25 to cause adherence of the second laminate 13 to the female preform 25 and separation from the male preform 19. Subsequently, the male preform 19 is removed, or the female preform 25 is displaced from the male preform 19, carrying therewith the second laminate 13.

The disclosed method provides for the association with the second laminate 13 of one or more reinforcing or other members which are to be eventaully united to the first and second laminates as part of the overall end product. Such members can include, for example, a premolded, unitary, structural foam floor board 29 as shown in FIGURE 4, or a series of longitudinal reinforcing members as shown in assembled relation with the second laminate in FIGURES 7 and 8.

More specifically, such member or members 29 are assembled with the second laminate 13 and, initially, are placed on a male die 31 which otherwise conforms to the inner shape of the second laminate 13. The male die 31 and the female preform 25, with the second laminate 13 carried therein, are then brought together, as shown in the upper portion of FIGURE 4. Subsequently, the vacuum applied through the female prefrom 25 is discontinued to permit transfer of the second laminate 13 onto the male die 31 with the reinforcing member or members 29 contained therebetween and to permit separation and removal of the female preform 25 from the second laminate 13.

The second laminate 13 is then secured to the male die 31. Various arrangements can be used. For instance, mechanical gripping means can be applied to the periphery of the second laminate 13 to retain the second laminate on the male die. Alternately or in addition, one or more fibrous belts which, in part, will ultimately form a portion of the completed product, can be wrapped around the laminate 13 and the die 31 to prevent unwanted separation from each other.

During fabrication and subsequent assembly of the second or male laminate 13 on the male die 31, the first or female laminate 11 is cured in the female die 15. The female die 15 is then located, if not already disposed, so that the female laminate 11 is upwardly open with its periphery in a generally horizontal plane, thereby locating the female laminate so as to retain a charge or quantity of resin 33 in the bottom thereof. The male die 31 is then located to position the male laminate 13 in facing relation to the female laminate 11 and to permit subsequent insertion of the male laminate 13 in the female laminate 11. Immediately prior to insertion of the male laminate into the female laminate, the polyester resin 33, premixed with a catalyst in the form of an oxidizing agent, such as benzol peroxide, and a promotor in the form of an oxidizing agent, such as diethyl analymine, is introduced into the bottom or sump of the female laminate 11.

Lowering of the male laminate 13 into the female laminate 11 and uniting of the male and female laminates is achieved without the application of any substantial amount of pressure. Entry of the lowest part of the male laminate 13 into the pool of resin 33 displaces the resin upwardly along the sides from the bottom of the female laminate 11, such resin flow displacing air from between the laminates, and from the interstices of the second or male laminate 13.

The quantity of resin previously deposited in the female or first laminate 11 is predetermined to provide a resulting intermediate resinous laminate between the first and second laminates, to generally impregnate the second laminate, to bind the second laminate to such reinforcing member or members 29 as may be carried between the second laminate 13 and the male die 31, and to provide a small amount of resin in excess of the volume which can be retained in the area between the female and male dies 15 and 31. Accordingly, although a minor amount of spill-over occurs, disposition of an intermediate or resinous laminate 35 throughout the entire area between the first and second laminates is assured. An overflow arrangement to a resin reservoir can be employed to salvage excess resin.

The use of premixed resin, as above mentioned, provides for curing of the resin without appreciable heat transfer or variation in the temperature of the first and second laminates 11 and 13. The absence of any appreciable pressure exerted between the female and male dies 15 and 31 permits the use of foamed reinforcing members, such as the floor board structure 29, whereby an added degree of buoyancy is provided.

After the resinous laminate has cured, the attachment between the male die 31 and the second laminate 13 is severed, as for instance, by cutting the fibrous bands or straps, and the male die 31 is removed. Subsequently, the completed, laminated structure 37 is removed from the female die 15, thereby again making the female die 15 available for the application of another coat of "Gel-Kote."

The embodiment shown in FIGURES 7 and 8 illustrates the bonding to a second laminate 113 of a series of individual longitudinal reinforcing stringers 129 in place of a unitarily molded, foamed floor board. FIGURE 8 also shows heat exchanging coils 141 in male and female dies 115 and 131. The coils 141 can be employed to maintain a predetermined temperature condition during curing of the intermediate resinous laminate 135, or for applying heat, as desired, if other than a self-curing resin is employed. The coils can also be used to maintain a desired temperature condition in the female die 115 during fabrication or molding of the first or female laminate 111.

In the embodiment shown in FIGURES 9 and 10, reinforcing members in the form of stringers 229 are embodied in the completed hull between the outer and inner laminates 211 and 213, respectively. More specifically, the laminate 213, shown in FIGURE 9 in assembled relation on the female preform 215, can be fabricated in the same fashion as the laminate 13. Alternatively, the laminate 213 can be formed by spraying a mixture of resin and chop directly onto the inner surface of the female preform 225, when such preform is connected to a suitable vacuum source 227, in generally the same manner as with respect to the formation of the laminate 13 on the male preform 19. The laminate 213 is generally similar to the laminate 13 except that projections 251 extend inwardly of the concavity formed by the laminate, rather than outwardly as in the laminate 13.

The laminate 211, shown in the female die 215, is fabricated in the same manner and in the same form as the laminate 13. However, in the embodiment shown in FIGURES 9 and 10, prior to insertion of the inner or male laminate 213 on the male die 231 into the outer or female laminate 211, the stringers 229 are placed in the outwardly extending projections 253 of the female laminate 211. The rigidifying stringers 229 can be either of foam material to provide added buoyancy or of solid material. The stringers 229 can be united or bonded to the female laminate 211 prior to deposit of a pool 233 of resin therein and the insertion of the male laminate 213, or in case the stringers 229 are of greater density than the resin, the stringers can be simply laid in place prior to deposit of the resin. Alternatively, the stringers can be secured within the projections or ribs 251 in the male laminate 213 prior to insertion thereof into the female laminate 211. FIGURE 10 shows the completed product with an intermediate resinous laminate 235 and the stringers 229 bonded between and to the outer and inner laminate 211 and 213, respectively.

The methods disclosed above provide efficient arrangements for producing a laminated product which has a relatively hard, lustrous surface, which may incorporate reinforcements of various kinds, and which includes a bond between the inner and outer laminates which is substantially free of air.

Various of the features of the invention are set forth in the following claims.

What is claimed is:

1. A molding method comprising the steps of forming a first upwardly open laminate in the cavity of a first female die from a material providing a finished outer surface, providing a second laminate in the cavity of a second female die, inserting a male die into the second laminate, transferring the second laminate from the second female die to the male die, introducing a quantity of a resinous bonding agent into the interior bottom of the first laminate, and inserting the male die carrying the second laminate thereon into the first laminate while the first laminate is supported in the first female die so as to displace the resin from the bottom of the first laminate to form a third laminate bonding the first and second laminates and so as to eliminate air from between the first and second laminates.

2. A molding method comprising the steps of forming a first upwardly open laminate in the cavity of a female die, placing a preformed structural member on a male die, locating a second laminate on the male die in overlying relation to the structural member, the second laminate being at least partially porous, introducing a quantity of a resinous bonding agent into the interior bottom of the first laminate, and inserting the male die carrying the structural member and the second laminate into the first laminate while the first laminate is supported in said female die so as to displace the resinous bonding agent from the bottom of the first laminate to impregnate the second laminate, to form a third laminate bonding the first and second laminates, and to bond the structural member to the second laminate.

3. A molding method comprising the steps of forming a first upwardly open laminate in the cavity of a female die, locating a second laminate on a male die, the second laminate being at least partially porous, locating a preformed structural member in adjacent relation to the second laminate, introducing a quantity of a resinous bonding agent into the interior bottom of the first laminate, and inserting the male die carrying the second laminate into the first laminate while the structural member is retained in adjacent relation to the second laminate and while the first laminate is supported in the female die so as to displace the resinous bonding agent from the bottom of the first laminate to impregnate the second laminate, to form a third laminate bonding the first and second laminates, and to bond the structural member to the laminates.

4. A molding method comprising the steps of forming a first upwardly open laminate in the cavity of a female die from a material providing a finished outer surface, introducing a quantity of a resinous bonding agent into the interior bottom of the first laminate, placing a second, partially porous preformed laminate into the first laminate, and inserting a male die carrying a third laminate into the first laminate while the first laminate is supported in the female die so as to upwardly displace the resinous bonding agent from the bottom of the first laminate to impregnate the second laminate, and to bond the first, second, and third laminates.

References Cited
UNITED STATES PATENTS

| | | | |
|---|---|---|---|
| 2,613,397 | 10/1952 | Borkland | 156—228 |
| 2,642,920 | 6/1953 | Simon et al. | |
| 2,702,261 | 2/1955 | Bacon et. al. | |
| 2,751,962 | 6/1956 | Drummond. | |

EARL M. BERGERT, *Primary Examiner.*

W. J. VAN BALEN, *Assistant Examiner.*